(12) United States Patent
Kullberg

(10) Patent No.: US 8,083,279 B1
(45) Date of Patent: Dec. 27, 2011

(54) PICKUP TRUCK LOAD BALANCING DEVICE

(76) Inventor: Keven P. Kullberg, Cave Creek, AZ (US)

( * ) Notice: Subject to any disclaimer, the term of this patent is extended or adjusted under 35 U.S.C. 154(b) by 77 days.

(21) Appl. No.: 12/651,211

(22) Filed: Dec. 31, 2009

(51) Int. Cl.
*B60J 7/00* (2006.01)

(52) U.S. Cl. .................................. 296/26.09; 296/26.08

(58) Field of Classification Search .............. 296/26.09, 296/26.08; 414/522
See application file for complete search history.

(56) References Cited

U.S. PATENT DOCUMENTS

| | | | |
|---|---|---|---|
| 3,768,678 A | 10/1973 | Youngers | |
| 4,203,697 A | 5/1980 | Cayton | |
| D257,966 S | 1/1981 | Page | |
| 5,022,809 A | 6/1991 | Hinson | |
| 5,564,767 A * | 10/1996 | Strepek | 296/26.09 |
| 6,079,742 A | 6/2000 | Spence | |
| 6,450,742 B1 | 9/2002 | Jenkins et al. | |
| 6,860,536 B1 | 3/2005 | Schimunek | |
| 7,111,887 B2 * | 9/2006 | Cooley | 296/37.6 |
| 7,207,615 B2 * | 4/2007 | St. Romain | 296/26.09 |
| 7,347,017 B2 * | 3/2008 | Shaffer, Jr. | 40/591 |

* cited by examiner

Primary Examiner — Joseph Pape

(57) ABSTRACT

A load balancing device for use in a pickup truck bed that allows a heavy load of cargo to be moved from the tailgate end to the front end of the truck bed, comprising a rectangular base having a first side, a second side, a front bar, a middle bar, and a back bar. The first side and the second side of the base together function as a track for a slide plate to slide up and down the length of the base. The slide plate is for holding the cargo to be put in the truck bed. An outer shaft and an inner piston together form a movement assembly, which allows for the slide plate to be moved along the length of the base.

1 Claim, 5 Drawing Sheets

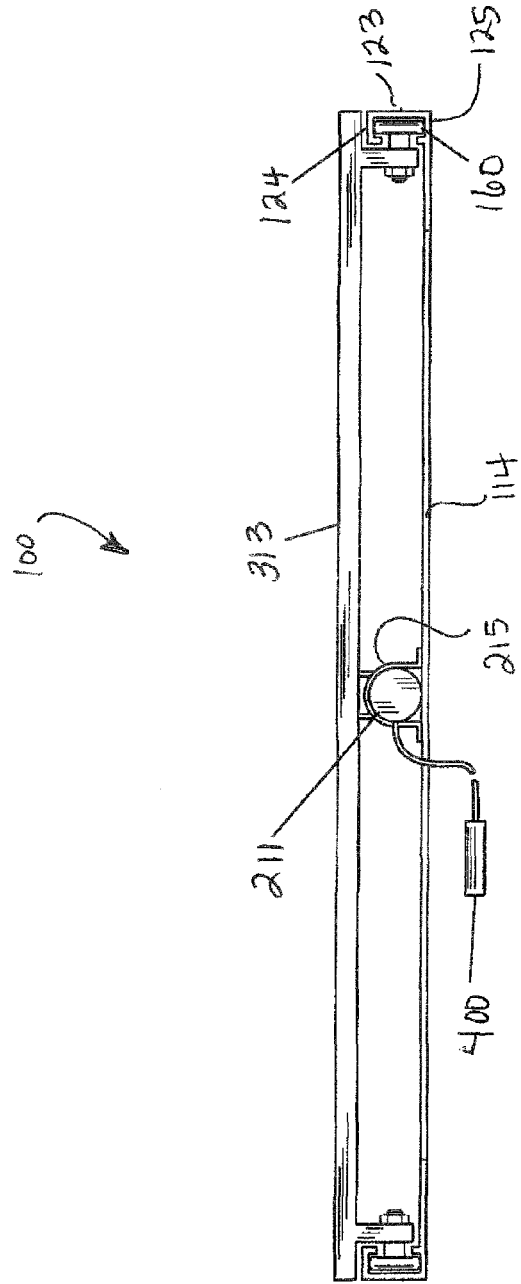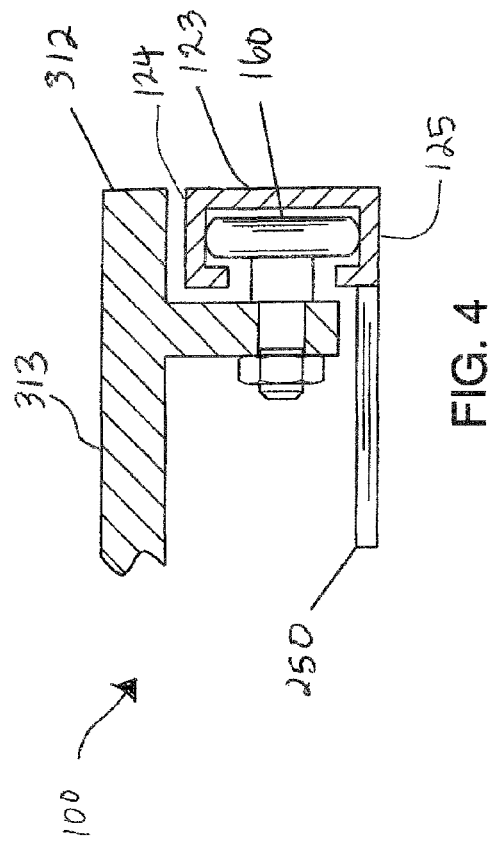

(BOTTOM VIEW)

PICKUP TRUCK LOAD BALANCING DEVICE

FIELD OF THE INVENTION

The present invention is directed to a device for handling cargo in a truck bed. More particularly, the present invention is directed to a device for balancing a load of cargo in a pickup truck bed.

BACKGROUND OF THE INVENTION

The present invention features a load balancing device for use in a pickup truck bed that allows a heavy load of cargo to be moved from the tailgate end to the front end of the truck bed, thus improving overall balance of the truck.

The load balancing device of the present invention comprises a generally rectangular base having a first side, a second side, a front bar, a middle bar, and a back bar. The shape of the first side of the base and the second side of the base is generally C-shaped. The first side of the base and the second side of the base together function as a track for a slide plate to slide up and down the length of the base. The slide plate is for holding the cargo to be put in the truck bed. An outer shaft and an inner piston together form a movement assembly, which allows for the slide plate to be moved along the length of the base.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

FIG. 3 is a front view of the load balancing device of the present invention.

FIG. 4 is a front view and cross sectional view of the load balancing device of the present invention.

DESCRIPTION OF PREFERRED EMBODIMENTS

Figure 1:
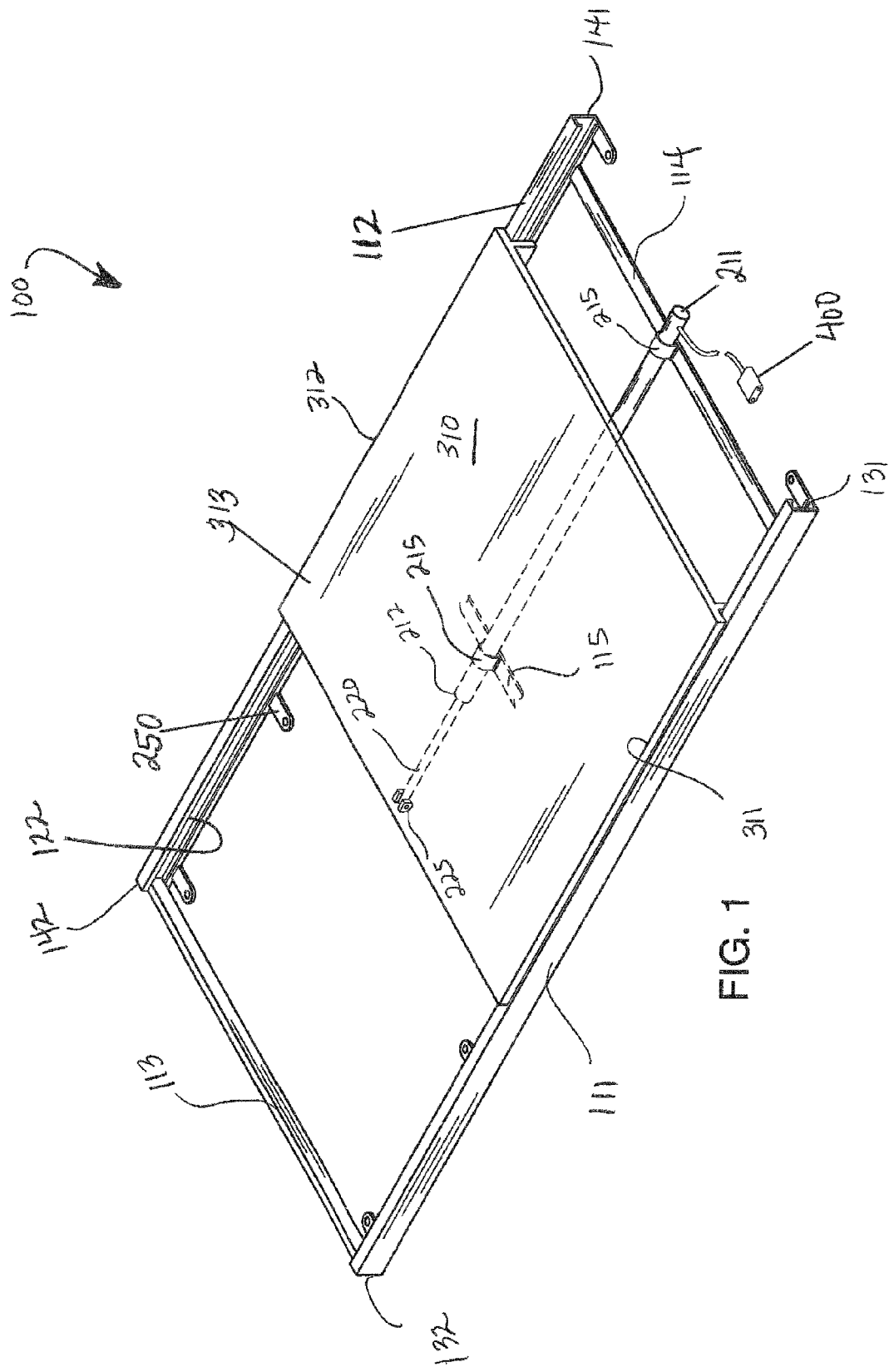
FIG. 1 is a perspective view of the load balancing device of the present invention.
Figure 2:
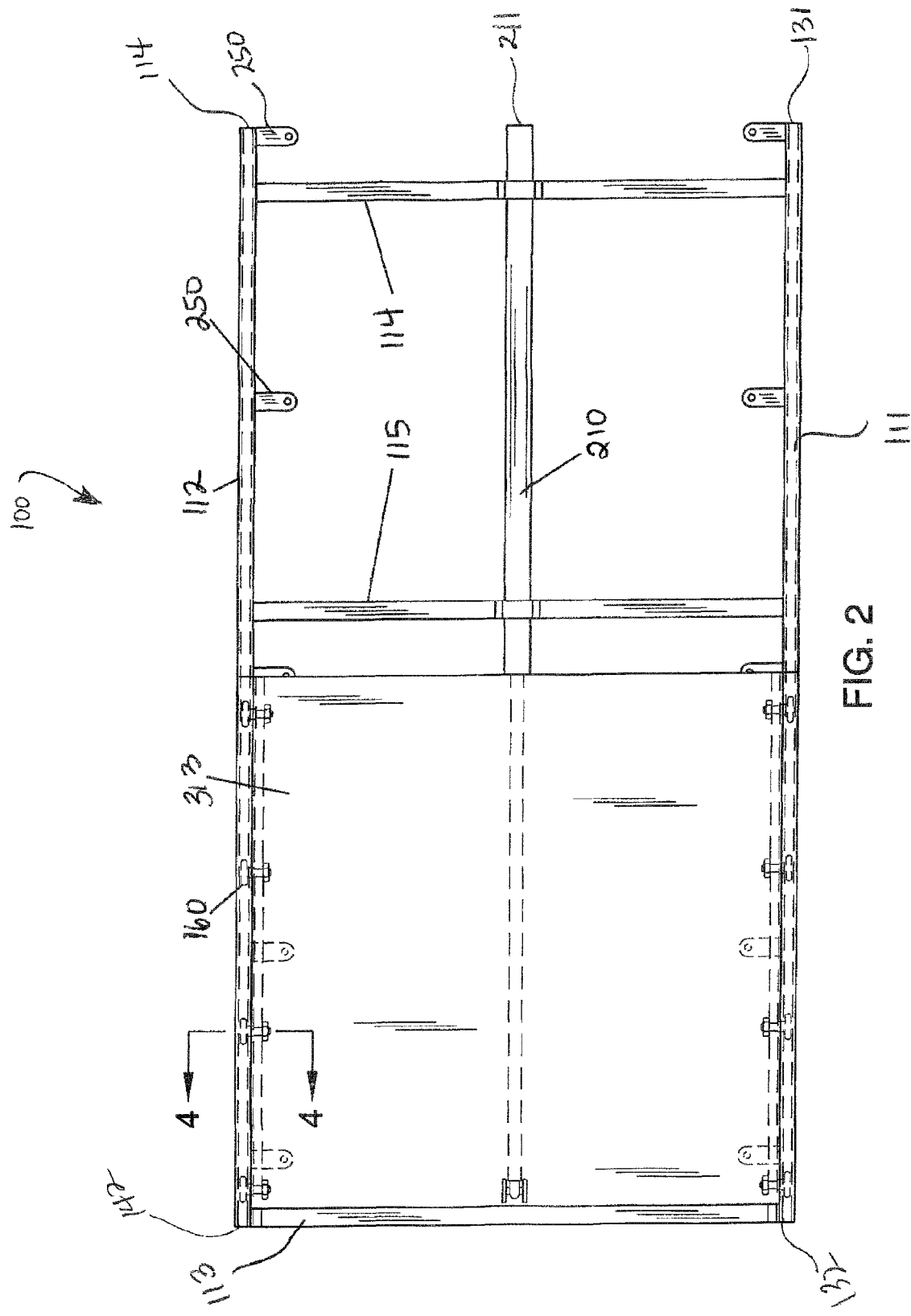
FIG. 2 is a top view of the load balancing device of the present invention.
Figure 5:
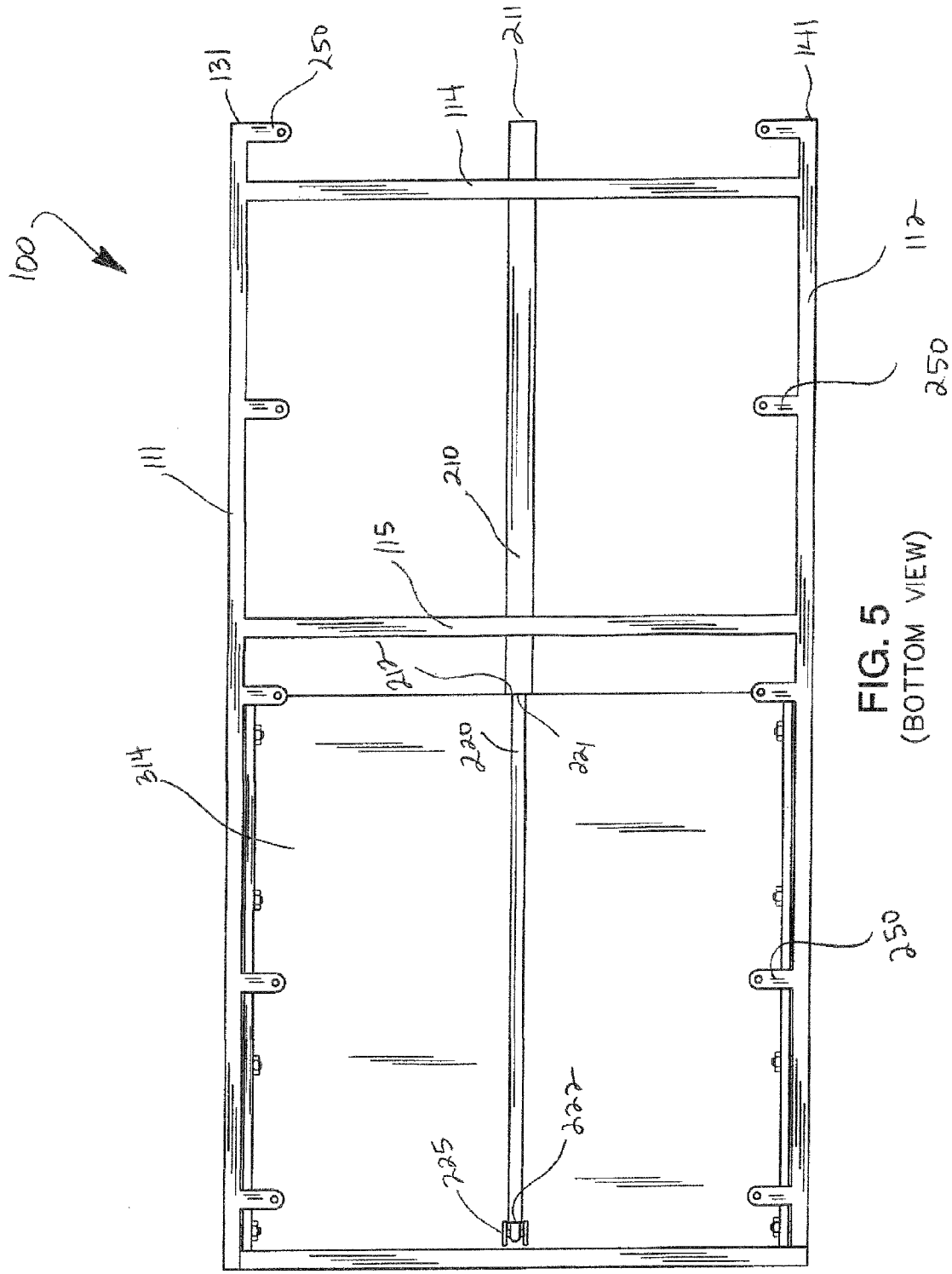
FIG. 5 is a bottom view of the load balancing device of the present invention.
Figure 6:
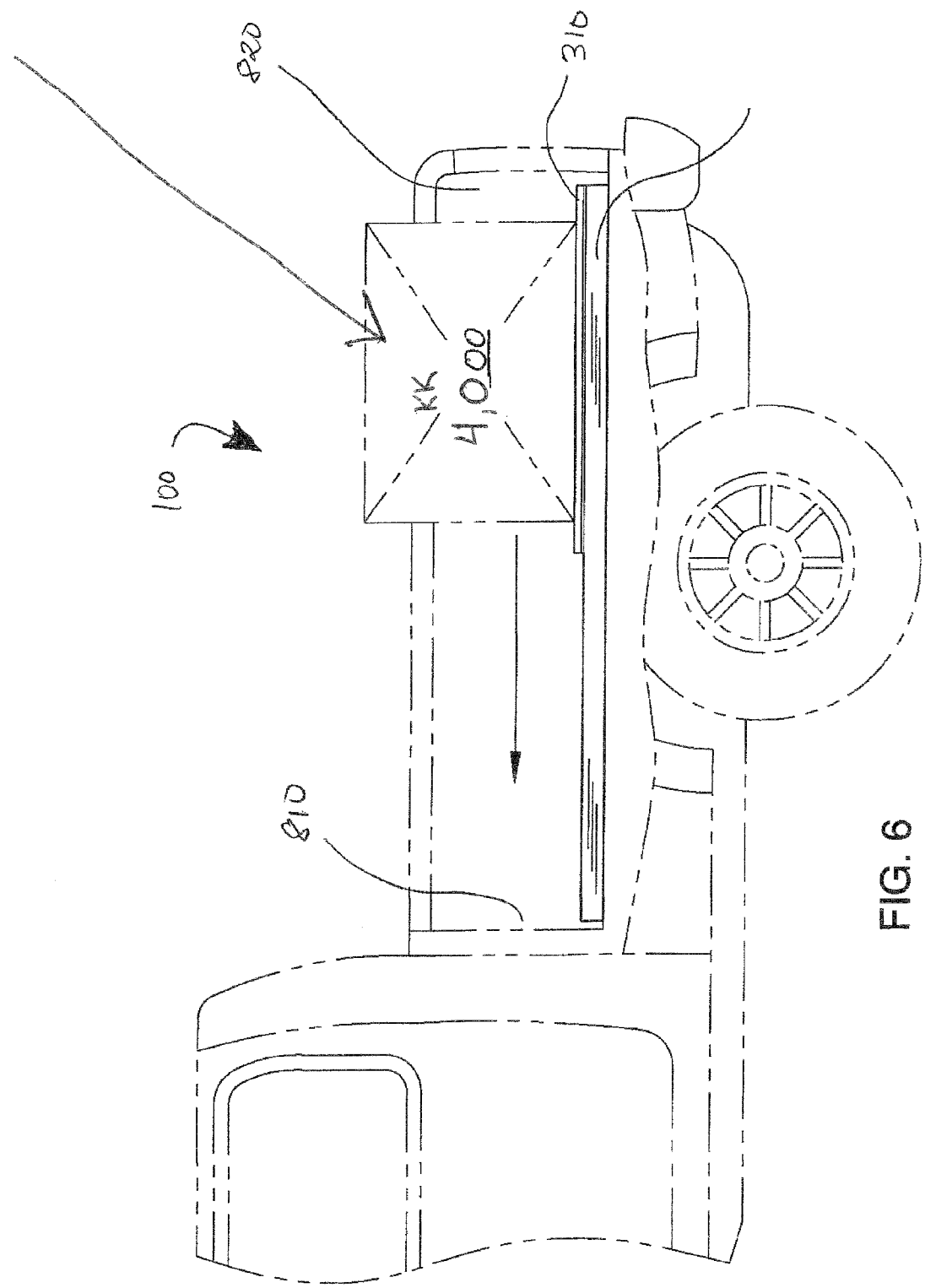
FIG. 6 is a side view of the load balancing device of the present invention as used in a pickup truck bed.

The following is a listing of numbers corresponding to a particular element refer to herein:
100 load balancing device
110 base
111 first side of base
112 second side of base
113 back bar of base
14 front bar of base
115 middle bar of base
122 inside surface of side of base
123 outside surface of side of base
124 top surface of side of base
125 bottom surface of side of base
131 first end of first side of base
132 second end of first side of base
141 first end of second side of base
142 second end of second side of base
160 track wheel
210 outer shaft
211 first end of outer shaft
212 second end of outer shaft
215 outer shaft attachment means
220 inner piston
221 first end of inner piston
222 second end of inner piston
225 inner piston attachment means
250 mounting bracket
310 slide plate
311 first side of slide plate
312 second side of slide plate
313 top surface of slide plate
314 bottom surface of slide plate
400 electrical connection
800 cargo
810 front of truck bed
820 back of truck bed Referring now to FIGS. 1-6, the present invention features a load balancing device 100 for use in a pickup truck bed that allows a heavy load of cargo 800 to be moved from the tailgate end 820 to the front end of the truck bed 810, thus improving overall balance of the truck.

The load balancing device 100 of the present invention comprises a generally rectangular base 110 having a first side 111, a second side 112, a front bar 114, a middle bar 115, and a back bar 113, wherein both the first side 111 and the second side 112 have a first end 131, a second end 132, and a middle. The first end of the first side of the base 131 is connected to the first end of the second side of the base 141 via the front bar 114. The second end of the first side of the base 132 is connected to the second end of the second side of the base 142 via the back 113. The middle of the first side of the base is connected to the middle of the second side of the base via the middle bar 115.

The shape of the first side of the base 111 and the second side of the base 112 is generally C-shaped with an open front portion the right side of the "C") being the inside surface of the side of the base 122, a closed back portion (e.g., the left side of the "C") being the outside surface of the side of the base 123, a top wing (e.g., the top of the "C") being the top surface of the side of the base 124, and a bottom wing (e.g., the bottom of the "C") being the bottom surface of the side of the base 125 (see FIG. 1, FIG. 4). The first side of the base 111 and the second side of the base 112 together function as a track for a slide plate 310 to slide up and down the length of the first side 111 and the second side of the base 112.

The slide plate 310 is for holding the cargo 800 to be put in the truck bed. The slide plate 310 has a top surface 313, a bottom surface 314, a first side 311, and a second side 312. Disposed on the bottom surface of the slide plate 314 near the first side 311 and near the second side 312 is a plurality of track wheels 160. The track wheels 160 are for engaging the first side 111 and the second side of the base 112. The track wheels 160 can be inserted into the first side of the base 111 or the second side of the base 112 wherein the track wheel 160 can move forward and backward along the bottom surface 125 of the first side of the base 111 or the second side of the base 112. This allows the cargo 800 to be moved forward or backward along the length of the base 110. The track wheels 160 are attached to the bottom surface of the slide plate 314 via an attachment means e.g., bolt assembly).

Extending from the bottom surface 125 of the first side of the base 111 and the bottom surface 125 of the second side of the base 112 is a plurality of mounting brackets 250 for attaching the base 110 to the truck bed. The mounting brackets 250 extend inwardly toward the opposite side of the base 110. The mounting brackets 250 are generally parallel to the slide plate 310.

An outer shaft 210 having a first end 211 and a second end 212 is attached to the front bar 114 and the middle bar 115 of the base 110 via an attachment means 215 (e.g., a strap, welding, a screw mechanism, the like). An inner piston 220 having a first end 221 and a second end 222 is telescopically received in the second end of the outer shaft 212. The second end of the inner piston 222 is attached to the bottom surface of the slide plate 314 via an attachment means 225 (e.g., welding, a screw mechanism, the like). The outer shaft 210 and the inner piston 220 together form a movement assembly, which allows for the slide plate 310 to be moved along the length of the base 110. In some embodiments, the movement assembly is electrically connected to a power source 400 (e.g., 12-volt electric winch).

The inner piston 220 can slide inside the outer shaft 210 up and down along the length of the shaft. The power source 400 causes the inner piston 220 to move in this manner. When the movement assembly is activated with the power source 400, the inner piston 220 movement causes the slide plate 310 to move forward and backward along the length of the base 110. In some embodiments, the load balancing device 100 is electrically connected to a 12-volt electric winch motor or hydraulic In some embodiments, the load balancing device 100 of the present invention further comprises a jack leg for attaching to the rear receiver hitch of the truck. The leg is for helping to support the weight of the load balancing device 100 during both the loading process and the unloading process.

In some embodiments, a user can install the load balancing device 100 in his/her pickup truck and can load the cargo 800 onto the slide plate 310 via a forklift. In some embodiments, the user can then activate the load balancing device 100 via a control switch. In some embodiments, the electric motor or the hydraulic ram causes the slide plate 310 to move the cargo 800 from the back of the truck bed 820 toward the front of the truck bed 810 to center the load and distribute the weight of the cargo 800 evenly in the truck bed.

In some embodiments, the load balancing device 100 can accept a load up to about 2 tons.

As used herein, the term "about" refers to plus or minus 10% of the referenced number. For example, an embodiment wherein the base is about 8 feet in length includes a base that is between 7.2 and 8.8 feet in length.

The load balancing device 100 of the present invention may be constructed in a variety of sizes. For example, in some embodiments, the base 110 is between about 4 to 6 feet in length as measured from the first end of the first side 131 to the second end of the first side 132. In some embodiments, the base 110 is between about 6 to 8 feet in length as measured from the first end of the first side 131 to the second end of the first side 132. In some embodiments, the base 110 is more than about 8 feet in length.

In some embodiments, the base 110 is between about 40 to 45 inches in width as measured from the first side 111 to the second side 112. In some embodiments, the base 110 is between about 45 to 50 inches in width as measured from the first side 111 to the second side 112. In some embodiments, the base 110 is between about 50 to 60 inches in width as measured from the first side 111 to the second side 112. In some embodiments, the base 110 is more than about 60 inches in width.

In some embodiments, the base 110 is between about 2 to 4 inches in height as measured from the top surface of the first side of the base 124 to the bottom surface of the first side of the base 125. In some embodiments, the base 110 is between about 4 to 5 inches in height as measured from the top surface of the first side of the base 124 to the bottom surface of the first side of the base 125. In some embodiments, the base 110 is between about 5 to 8 inches in height as measured from the top surface of the first side of the base 124 to the bottom surface of the first side of the base The following the disclosures of the following U.S. Patents are incorporated in their entirety by reference herein: U.S. Pat. No. 6,079,742; U.S. Pat. No. 5,022,809; U.S. Pat. No. 6,450,742; U.S. Pat. No. 4,203,697; U.S. Pat. No. 3,768,678; U.S. Pat. No. 6,860,536 B1.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A load balancing device for allowing cargo to be moved between a tailgate end of a truck bed to a front end of the truck bed, said load balancing device comprising:
   (a) a generally rectangular base having a first side having a first end, a second end, and a middle, and a second side having a first end, a second end, and a middle; wherein a front bar connects the first end of the first side to the first end of the second side, a back bar connects the second end of the first side of to the second end of the second side of the base, and a middle bar connects the middle of the first side to the middle of the second side; wherein the first side and the second side have a C-shaped cross section;
   (b) a slide plate for holding the cargo, wherein the slide plate has a top surface, a bottom surface, a first side, and a second side, wherein a plurality of track wheels are disposed on the bottom surface both near the first side and near the second side, wherein the track wheels are for engaging the first side and the second side of the base, wherein the slide plate can slide up and down the base either toward the front bar or toward the back bar;
   (c) a plurality of mounting brackets on the bottom surface of the first side of the base and on the bottom surface of the second side of the base, wherein the mounting brackets are for attaching the base to the truck bed; and
   (d) a movement assembly comprising an outer shaft and an inner piston, wherein the outer shaft has a first end and a second end and is attached to the front bar and the middle bar of the base via an attachment means, wherein the inner piston has a first end and a second end and is telescopically received in the second end of the outer shaft, wherein the second end of the inner piston is attached to the bottom surface of the slide plate via an attachment means; wherein the movement assembly allows the slide plate to moved up and down the base.

* * * * *